United States Patent [19]
Heumann et al.

[11] 3,865,968
[45] Feb. 11, 1975

[54] TERMINATORS FOR ELECTRICAL SUPERCONDUCTOR CABLE INSTALLATIONS

[75] Inventors: Heinz Heumann, Rheydt; Helmut Kuhmann, Dusseldorf, both of Germany

[73] Assignee: AEG-Telefunken Kabelwerke AG, Rheydt (Rugh)-Saarn, Germany

[22] Filed: Oct. 2, 1973

[21] Appl. No.: 402,810

[30] Foreign Application Priority Data
Oct. 6, 1972 Germany............................ 2249801
Oct. 6, 1972 Germany............................ 7237304

[52] U.S. Cl........................ 174/15 BH, 174/DIG. 6
[51] Int. Cl.............................................. H01v 11/00
[58] Field of Search............174/15 BH; 15 C, 15 R, 174/DIG. 6, 12 BH, 16 BH, 18, 19, 20

[56] References Cited
UNITED STATES PATENTS

| | | | |
|---|---|---|---|
| 3,440,326 | 4/1969 | Lair............................... | 174/15 C X |
| 3,522,361 | 7/1970 | Kafka............................ | 174/15 C |
| 3,539,702 | 11/1970 | Edwards et al.................. | 174/19 X |
| 3,716,652 | 2/1973 | Lusk et al...................... | 174/15 BH X |
| 3,728,463 | 4/1973 | Kullmann......................... | 174/15 C |
| 3,758,699 | 9/1973 | Lusk et al...................... | 174/19 |
| 3,767,835 | 10/1973 | Engelhardt....................... | 174/19 X |

*Primary Examiner*—Arthur T. Grimley
*Attorney, Agent, or Firm*—Spencer & Kaye

[57] ABSTRACT

A terminator (which terminator includes a cable fitting which terminates a superconductor cable but which leads, instead of to a lead-out bolt, for example to a standard conductor of an adjoining cable) for an electrical superconductor cable installation, has a zone of temperature increase from superconductor to normal conductor in the direction of the terminator longitudinal axis, separated from the zone of electrical field reduction. Advantageously, the temperature increase zone, which contains a heat-exchange system, is disposed outside, preferably below, the terminator external insulator surrounding the normal conductor.

7 Claims, 1 Drawing Figure

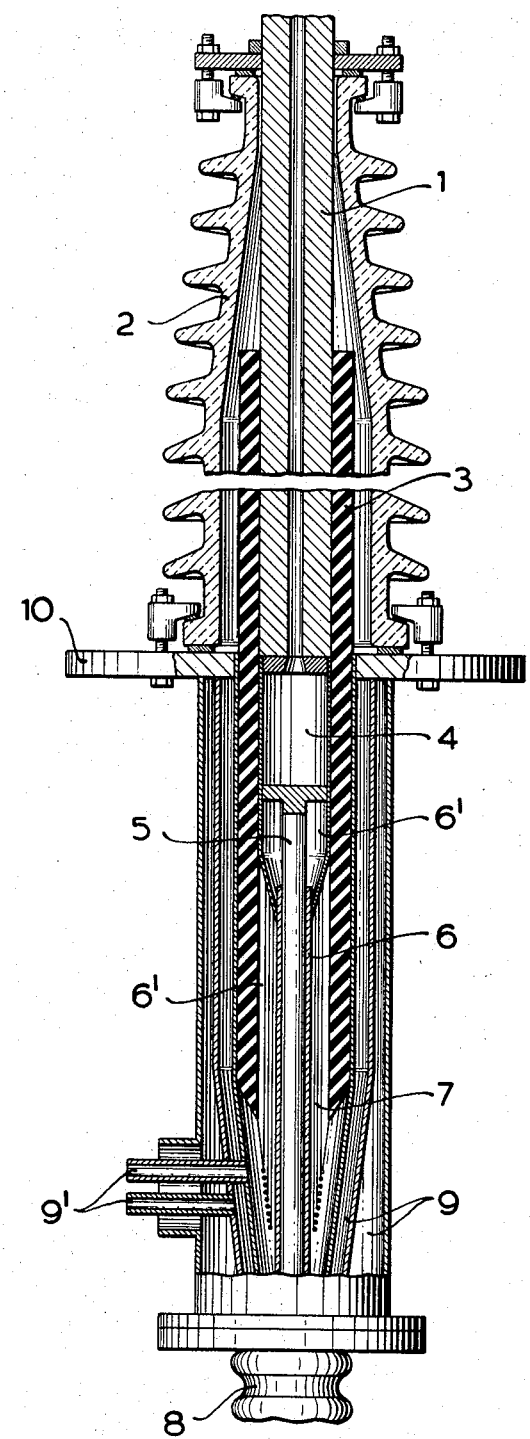

TERMINATORS FOR ELECTRICAL SUPERCONDUCTOR CABLE INSTALLATIONS

BACKGROUND OF THE INVENTION

This invention relates to terminators for electrical superconductor cable installations.

Conductors which have practically no resistance, that is superconductors, are becoming increasingly important technologically in electrical cables, more particularly for power transmission. The resistanceless effect or, in other words, the superconductivity effect, occurs of course when two steps are applied simultaneously, that is, firstly, the use of specific alloys, for example niobium-based alloys, and, secondly, cooling of the electrical conductors to extremely low temperatures near the absolute temperature zero, more particularly temperatures below the transition temperatures of 20°–1°K. It is well known that the temperature zones of 20°–14° and 4.2 to 1°K can be obtained by using hydrogen and helium.

The prior-art applications of low temperatures to the production of terminators for electrical power transmission cables, using very cold media to provide the low temperatures, serve to solve other problems. For example, German Patent Specification No. 580 084 discloses a terminator for gas-filled or oil-filled high tension cables, wherein metal parts having different coefficients of expansion are so assembled — after cooling with liquid $CO_2$ or another very cold liquid, using an intermediate member if required — that the terminator is satisfactorily sealed at the lowest temperature occurring in operation (for example about −30°C) and the metal parts press against one another owing to their different coefficients of expansion on heating of the terminator; a wedge-shaped construction of the parts which are to be connected may also serve to increase the strength of the connection. German Patent Specification No. 644 913 also discloses a method of producing terminators for electrical high-tension rubber-insulated cables, wherein the cable parts which are to be treated are exposed to low temperatures using liquid air, the temperatures being such that the said cable parts temporarily lose their resilient properties, thus facilitating treatment.

The known power cable terminators are usually so constructed that the individual cable conductor is connected directly by screw connection, welding or the like to the bolt which leads out of the terminator external insulator an which has substantially the same cross-section. Power cable terminators are known to us in Germany, however, wherein a resilient connecting member is disposed between the cable conductor end and the lead-out bolt and serves to take the considerable forces due to the thermal expansions of the individual parts during operation, which may cause insulator breakage, bending of the conductor connections and other serious damage. Such resilient connecting members may consist of metal strips to braid or, according to German Patent Specification No. 870,289, of a plurality of superposed strip laminations having, for example, the form of a cut-open ring or a spiral. With the known terminators, it is conventional to retain the insulation of the cable conductor through the terminator and to interrupt it only just before the fixed or resilient connection to the lead-out bolt and complement it at higher operating voltages inside the terminator by means of potential control elements known in various forms.

The basic principle of the prior-art constructions of power cable terminators may be designated the most compact construction. This known basic principle which is also applied to other cable fittings is required both in the longitudinal and in the transverse dimensions, irrespective of whether single-conductor or multi-conductor terminators are involved and irrespective of whether the terminator fillings which are adapted in respect of their content to the cable insulation are a compound, oil, gas or air.

When this known basic principle of the most compact construction, which has already been embodied with varying degrees of success but which is obviously always the aim and which is known from the construction of terminators for conventional cables, is to be applied to the construction of terminators for electrical cable installations having a transition from electrical conductors which have no substantial resistance to electrical conductors which have resistance, the temperature increase and the field decrease in such terminators must be effected in the same zone.

It is an object of the present invention to provide cable fittings for the transition from electrical conductors brought into the superconductivity condition, to conventional electrical conductors which have resistance. This problem arises particularly in the case of terminators for superconductor sections in cable installations in which there is a transition from superconductors kept below their transition temperature, to connecting conductors consisting of normally conductive material, preferably copper, at ambient temperature.

SUMMARY OF THE INVENTION

According to the present invention there is provided a terminator (as hereinafter defined) for an electrical superconductor cable installation, in which terminator the zone of temperature increase from superconductor to normal conductor in the direction of the terminator longitudinal axis is separated from the zone of electrical field reduction.

In development of the present invention, the first application consisted in that the temperature increase zone, which contains a heat-exchange system, is disposed outside, preferably below, the terminator external insulator surrounding the normal conductor.

An important idea which complements the invention and which is also of general importance for terminator construction for superconductor cable installations, is that a solid helium-impregnated insulation can be dispensed with completely or partially in the terminator zone and insulating cavities are insulated solely by helium (which is the preferred refrigerant in such installations).

One preferred feature of the invention is that a tubular breakdown-proof insulation surrounding the normal conductor inside the external insulator extends beyond the heat-exchange system and over an additional insulating member fitted to the superconductor end.

In a development of the invention, the temperature increase zone is surrounded by a plurality of hollow concentric additional cold-insulating chambers which are preferably kept at different (graduated) temperatures. Advantageously, the refrigerant inlets leading to the super conductor end and to the additional cold-insulating chambers are disposed level with the end of the additional insulating member on the cable side.

The term "terminator" as used herein includes cable fittings which terminate the superconductor cable but which lead, not to a lead-out bolt, but, for example, to a standard conductor of an adjoining cable at normal temperature (ambient temperature). To simplify the explanation of the invention hereinafter, however, the subject matter of the invention will continue to be referred to as terminator.

BRIEF DESCRIPTION OF THE DRAWING

For a better understanding of the present invention and to show how the same may be carried into effect, reference will now be made, by way of example, to the accompanying drawing, the single FIGURE of which shows a longitudinal sectional view of a terminator in accordance with the invention.

DESCRIPTION OF A PREFERRED EMBODIMENT

Referring now to the drawing, a normal conductor bolt 1, for example of copper, which leads out of the terminator, is surrounded by a conventionally finned external insulator 2, which preferably consists of porcelain and which widens out conically in the downward direction. A tubular breakdown-proof insulation 3 surrounding the normal conductor bolt 1 inside the external insulator 2 is used to reduce the field and may be provided with field control inserts (condenser plates). The external insulator 2 rests on a flange 10 which, as considered in the direction of the longitudinal axis of the terminator, is situated at the boundary between the field reduction zone and the temperature increase zone.

The temperature increase zone includes the actual thermal transition point in the form of an electrically conductive heat-exchange system 4 which will hereinafter be referred to as a heat-exchanger and which is, therefore, disposed outside the external insulator 2, that is below the external insulator 2 in the exemplified embodiment. Heat-exchangers are known in various forms, so that the heat-exchanger 4, the construction of which does not form part of the invention, requires no further description. Such exchanger could, for example have the form disclosed in U.S. Pat. No. 3,522,361 issued to Wilhelm Kafka, but with only one intermediate conductor since the embodiment illustrated herein includes only one super-cold conductor 5. The normal conductor bolt 1 at normal temperature terminates at the heat exchanger 4 from above and the super-cold cable conductor 5 of a superconductivity cable 8 terminates at the heat exchanger 4 from below. On electrical connection, therefore, the temperature transition from the super-cold conductor 5 to the normal conductor 1 takes place in this heat exchanger 4. An additional insulating member 7 is fitted to superconductor end insulation 6, which comprises, for example, paper impregnated with liquid helium, and the member 7 terminates conically on the inside and outside as is conventional and the tubular break-down-proof insulation 3 of the normal conductor bolt 1 extends down to the member 7. Between the member 7 and the tubular breakdown-proof insulation 3 relatively long insulation paths 6' are insulated solely or partially only by helium.

This step is a deduction from the results of investigation as to the breakdown strength at 4°K of liquid helium alone and of helium-impregnated paper. These results have surprisingly shown that, contrary to experience with oil-impregnated paper in comparison with oil alone, the electrical strength of liquid helium alone is equal to or greater than the breakdown strength of paper impregnated with liquid helium.

The step applied to the terminator according to the invention can generally be interpreted as follows: contrary to previous practice with oil-impregnated paper, various windings of helium-impregnated paper in superconductivity cable terminators can be dispensed with and the associated cavity insulating path may consist solely or partially of liquid helium.

The temperature increase zone of the terminator also includes several (for example two) surrounding hollow concentric additional cold-insulating chambers 9. As will be apparent from the drawing, for example, two refrigerant inlets 9' leading to the superconductor end 5 and to one of the two additional cold-insulating chambers 9 are disposed level with the externally conical end of the additional insulating member 7 on the cable side. In this way, the additional cold-insulating chambers 9 can be kept at different temperatures, if required in more than two or three stages.

The advance provided by the invention is that the problems arising in the construction of superconductor cable terminators, that is the need to control extremely great temperature differences in addition to extremely great conductor cross-sectional differences, can be solved or at least mitigated more satisfactorily and more readily with a reasonable outlay for the result achieved. Another advance is that conventional steps and insulants which do not, therefore, require further explanation can be used for the field reduction, because the temperature increase zone is separated from the field reduction zone which is associated with different problems. Another effect as a result is that the external porcelain insulator is at normal temperature and its function of providing a transition from the cable insulation to the air insulation is not made difficult by the otherwise applicable risk of freezing layers of water which would greatly reduce the flashover strength.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. In a terminator for an electrical superconductor cable installation, the terminator including a normal conductor, an external insulator surrounding the normal conductor and arranged to be disposed in an ambient temperature environment, a superconductor cable including a conductor and means maintaining the conductor at a temperature at which it is superconductive, and heat-exchange means defining a zone of temperature increase between the conductor of the superconductor cable and the normal conductor, the terminator presenting a longitudinal axis along which the heat-exchange means are interposed between the conductor of the superconductor cable and the normal conductor, the improvement wherein: said terminator further comprises means defining a zone of electrical field reduction; said electrical field reduction zone is separated from said zone of temperature increase; and said zone of temperature increase is located axially outside of the region occupied by said external insulator.

2. A terminator as defined in claim 1 wherein said zone of temperature increase is disposed below said external insulator.

3. A terminator as defined in claim 1 further comprising an insulating member disposed around said conductor of said superconductor cable and located near the end thereof which is adjacent said heat-exhange means, and a tubular break-down proof insulation surrounding said normal conductor, disposed within said external insulator, and extending around said heat-exchange means and at least a portion of said insulating member.

4. A terminator as defined in claim 3 further comprising means defining a plurality of hollow concentric cold-insulating chambers surrounding said temperature increase zone.

5. A terminator as defined in claim 4 wherein said cold-insulating chambers are arranged to be maintained at respectively different temperatures.

6. A terminator as defined in claim 4 further comprising means defining refrigerant inlets supplying the region surrounding said conductor of said superconductor cable and said cold-insulating chambers and located adjacent that end of said insulating member which is directed away from said normal conductor.

7. A terminator as defined in claim 1 further comprising a mass of insulating material occupying a region surrounding said conductor of said superconductor cable, said mass of insulation being constituted by helium and being free of any solid material.

* * * * *

UNITED STATES PATENT OFFICE
CERTIFICATE OF CORRECTION

PATENT NO. : 3,865,968
DATED : February 11th, 1975
INVENTOR(S) : Heinz Heumann et al It is certified that error appears in the above-identified patent and that said Letters Patent are hereby corrected as shown below:

In the heading of the patent, change the assignee identification to read: --AEG-TELEFUNKEN Kabelwerke AG, Rheydt, Column 1, line 50, change "an" to --and--; line 59, change "to" to --or--.

Column 2, last line, change "super conductor" to --superconductor--.

Column 5, line 9, change "heat-exhange" to --heat-exchange--.

Signed and Sealed this twenty-second Day of July 1975

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

PATENT NO. : 3,865,968
DATED : February 11th, 1975
INVENTOR(S) : Heinz Heumann et al It is certified that error appears in the above-identified patent and that said Letters Patent are hereby corrected as shown below:

In the heading of the patent, under [73] Assignee:, correct the assignee's address to read: --Mülheim(Ruhr)-Saarn, Germany--.

This certificate supersedes Certificate of Correction issued July 22, 1975.

Signed and Sealed this fourth Day of November 1975

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,865,968      Dated February 11, 1975

Inventor(s) Heinz Heumann et al.

It is certified that error appears in the above-identified patent and that said Letters Patent are hereby corrected as shown below:

In the heading of the patent, change the assignee to read -- AEG-TELEFUNKEN Kabelwerke AG, Rheydt, Mülheim (Ruhr)-Saarn, Germany --. Column 1, line 50, change "an" to -- and --; line 59, change "to" to -- or --. Column 2, last line, change "super conductor" to -- superconductor --. Column 5, line 9, change "heat-exhange" to -- heat-exchange --.

This certificate supersedes Certificates of Correction issued July 22, 1975 and Nov. 4, 1975.

Signed and Sealed this sixteenth Day of March 1976

[SEAL]

Attest:

RUTH C. MASON
*Attesting Officer*

C. MARSHALL DANN
*Commissioner of Patents and Trademarks*